(12) United States Patent
Surlaker et al.

(10) Patent No.: US 7,487,405 B1
(45) Date of Patent: Feb. 3, 2009

(54) METHOD AND MECHANISM FOR DYNAMICALLY CONFIGURING LOGICAL PATHS OF STATE MACHINES

(75) Inventors: Kapil Surlaker, Mountain View, CA (US); Sreenivas Gollapudi, Cupertino, CA (US); Lakshminarayanan Chidambaran, Fremont, CA (US); Debashis Saha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 39 days.

(21) Appl. No.: 10/144,330

(22) Filed: May 10, 2002

(51) Int. Cl.
  *G06F 11/00* (2006.01)
(52) U.S. Cl. .................. 714/49; 714/15; 714/47
(58) Field of Classification Search .......... 714/15, 714/34, 35, 47, 49, 775; 707/8, 10; 370/225, 370/296, 282; 709/237, 238; 326/46
  See application file for complete search history.

(56) References Cited

U.S. PATENT DOCUMENTS

| | | | | |
|---|---|---|---|---|
| 3,496,293 A | * | 2/1970 | Avery et al. ................. | 375/228 |
| 4,063,220 A | * | 12/1977 | Metcalfe et al. ........... | 340/825.5 |
| 4,287,589 A | * | 9/1981 | Nakamura et al. .......... | 370/296 |
| 4,926,414 A | * | 5/1990 | Baratz et al. ................ | 370/225 |
| 5,423,037 A | * | 6/1995 | Hvasshovd .................. | 707/202 |
| 5,546,543 A | * | 8/1996 | Yang et al. ................... | 709/235 |
| 6,341,367 B1 | * | 1/2002 | Downing ..................... | 716/16 |
| 6,418,538 B1 | * | 7/2002 | Garney et al. ............... | 713/502 |
| 6,662,196 B2 | * | 12/2003 | Holenstein et al. .......... | 707/202 |
| 6,765,882 B2 | * | 7/2004 | Rittle et al. ................. | 370/277 |
| 6,766,384 B2 | * | 7/2004 | Choi ........................... | 710/25 |
| 6,865,176 B2 | * | 3/2005 | Averbuch et al. ............ | 370/348 |

\* cited by examiner

*Primary Examiner*—Robert Beausoliel
*Assistant Examiner*—Philip Guyton
(74) *Attorney, Agent, or Firm*—Vista IP Law Group, LLP

(57) ABSTRACT

A method and mechanism for dynamically changing the logical path of a state machine to avoid conflicts or problems is provided. A toggle state is employed for a state machine that allows dynamic changes in the computation path of a state machine. By analyzing the expected response state of a remote state machine, toggle states can be inserted in the path of a local state machine to avoid conflicts. This approach can be advantageously employed to reduce or prevent half-duplex violations for communications between applications on multiple computing nodes.

41 Claims, 4 Drawing Sheets

US 7,487,405 B1

METHOD AND MECHANISM FOR DYNAMICALLY CONFIGURING LOGICAL PATHS OF STATE MACHINES

BACKGROUND AND SUMMARY

The invention relates to computing systems, and more particularly to a method and mechanism for dynamically configuring a state machine. A finite state machine can be considered a model of computation consisting of a set of states, a start state, definitional alphabet/symbols, and transition functions which map input symbols and current states to a next state. Computation begins in the start state, and changes to new states depending on the transition function. The logic/computation flows of many computer software/hardware mechanisms are implemented as finite state machines.

In a distributed or networked environment, multiple state machines may need to interact to perform work on behalf of the computing system. This occurs, for example, if a first software application performing work on a local computer node communicates and interacts with second software application performing work on a remote computer node. In this situation, it is likely that the computation of the state machine associated with the first software application will be affected by the computation of the state machine associated with the second software application, and vice versa.

When two state machines interact, problems may arise if a conflict exists between states at the two state machines. For example, assume that a first state machine is in a "send" state to send information to a second state machine. In a half-duplex environment, the first state machine is expecting the second state machine to be in a "receive" state, ready and able to receive the transmitted information. If the second state machine is in a conflicting state, then a half-duplex communications fault may occur. This type of conflicting state may exist, for example, if the second state machine was itself in a "send" state trying to simultaneously transmit information to the first state machine.

The present invention provides a method and mechanism to dynamically change the logical path of a state machine to avoid such conflicts. According to one embodiment of the invention, a "toggle" state is employed for a state machine that allows dynamic changes in the computation path of a state machine. By analyzing the expected response state of a remote state machine, toggle states can be inserted in the path of a local state machine to avoid conflicts. In one embodiment, this approach can be advantageously employed to reduce or prevent half-duplex violations for communications between applications on multiple computing nodes. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention relates to a method and system for dynamically change the logical path of a finite state machine to avoid conflicts. For illustrative purposes, the following explanation is made in the context of finite state machines corresponding to computer applications involving database software. It is noted, however, that the inventive concepts disclosed herein are not limited to database systems, and indeed, may be applied across a wide range of computing applications.

When two state machines interact, a wide variety of situations may arise in which a conflict occurs between states of the two state machines. For example, a half-duplex violation may occur if the state machines operate in half-duplex mode, and both state machines attempt to transmit over a network to each other at the same time. For a networked database environment, this type of conflict may occur, for example, when a "remote-mapped query" is executed having one or more "bind variables." Both remote-mapped queries and bind variables are explained in more detail below.

Remote Mapped Query

Figure 1:
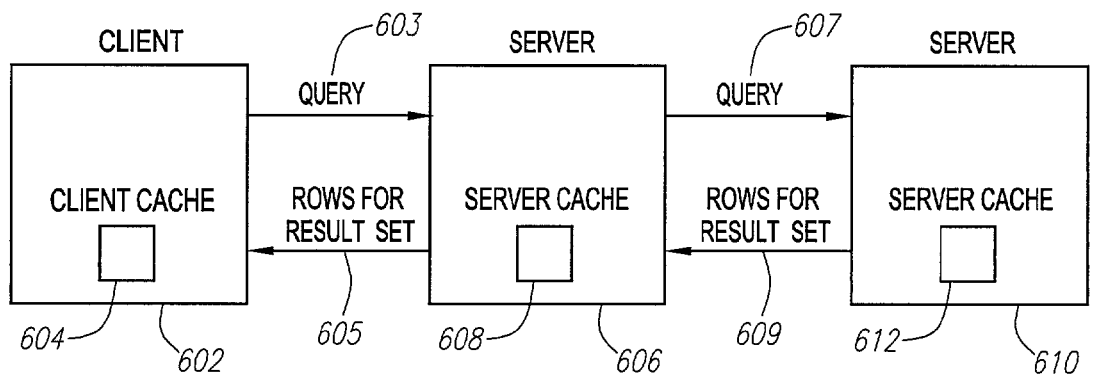
FIG. 1 illustrates a remote query.

As used herein, a remote mapped query refers to a query in which data that is accessed to respond to the query may exist at a remote location. FIG. 1 shows an architecture for implementing remote mapped queries according to one embodiment of the invention. Shown in FIG. 1 is a client device 602, a first server 606, and a second server 610. A client cache 604 may exist to locally cache rows for a result set 605 that is returned to the client 602 from first server 606. The first server 606 and second server 610 may each maintain its own cache 608 and 612, respectively, to locally cache data.

Consider the following query, written in the structured query language (SQL), in which first server 606 issues its own query 607 to second server 610 in response to receiving query 603 from client 602:

SELECT *
FROM table_at_server_606 A
WHERE EXISTS (SELECT * from table_at_server_610 B
WHERE A.value=B.value);

In an embodiment of the invention, this type of query can be satisfied by either moving the query to where the data is located or by moving the data to where the query is located. Various efficiency measures may be considered in determining whether the data or the query should be sent to a remote location, e.g., network efficiency or cache usage measures.

In the embodiment of the invention shown in FIG. 1, first server 606 requires access to data from second server 610 to process query 603. If the query is to be processed at second server 610 (i.e., a corresponding query 607 is sent from first server 606 to second server 610), then first server 606 essentially becomes a client to second server 610. It is noted that second server 610 may itself seek to remotely map a query to another server to process the query, which remotely maps the query to another server, etc., in an indefinite chain of remotely mapped queries. When processing remote query 607, rows of result set 609 are sent from second server 610 to first server 606. The rows in result set 609 are ultimately sent to client 602 as part of result set 605, with additional sorting, ordering, or processing possibly being performed at first server 606 depending upon the exact requirements of query 603. Therefore, it is very possible that the fetch commands issued to retrieve rows in result set 605 will cause corresponding fetch commands sent to second server 610 to retrieve rows in result set 609. These fetch commands may occur as a result of manipulating a scrollable cursor at client 602.

Bind Variables

A bind variable is a placeholder for literal values in a query sent to a server. To illustrate, consider the following query which does not include a bind variable:

SELECT *
FROM table foo
WHERE row_value='literal_value';

In this query, a table "foo" is searched for any row values ("row_value") that matches the literal "literal_value". There are some possible disadvantageous with directly placing a literal value into a query like this. For example, if the literal value is a very large string, then excess resources and time may be wasted in the database server performing parsing. In addition, if the literal value contains characters like single quotes, it may be necessary to double-quote them to avoid errors. Moreover, in some database systems, type checking may not occur on literal values.

To fix these and other problems, literal values in the query are replaced with a placeholder character (e.g., a bind variable), and the literal data corresponding to the bind variable is sent along afterwards. Substituting a bind variable for the literal, the above query would be modified as follows (with ":X" representing a bind variable):

SELECT *
FROM table foo
WHERE row_value=:X;

Possible Conflict Scenario

When sending a query having a bind variable from one computing node to another, some database systems will first send the query and immediately follow that query with a transmission of the literal value for the bind variable. In effect, the transmission pipeline between the first node and the second node will contain both the query and any associated bind variable literal values. When using a half-duplex communications protocol for such a system in one approach, the first node will expect the second node to be in a "receive" state for the entirety of the information to be send (e.g., query+bind data). If the second node decides to change to a "send" state and begin its own transmission of data to the first node before the entire message is received, then a half-duplex error may occur since the second node's message may overwrite part of the first node's message.

With remote-mapped queries, the first node may send a query to the second node wherein the query requires access to a table that exists only on the first node. In this situation, it is possible that the second node lacks the definitional information or metadata that is needed to access the table on the first node. The second node may therefore need to send a request to the first node for the definitional information to continue processing the query. This involves the second node changing to a "send" state to send the information request to the first node. In some systems, this information request is immediately sent after the second node receives the query and identifies that information is needed about a table from the first node.

The problem that arises is that the second node may be placing the information request into the communications pipeline while bind variable information is still being transmitted from the first node. In a half-duplex environment, this could cause a transmission error, e.g., if the information request from the second node overwrites part of the bind variable data sent by the first node.

Figure 2:
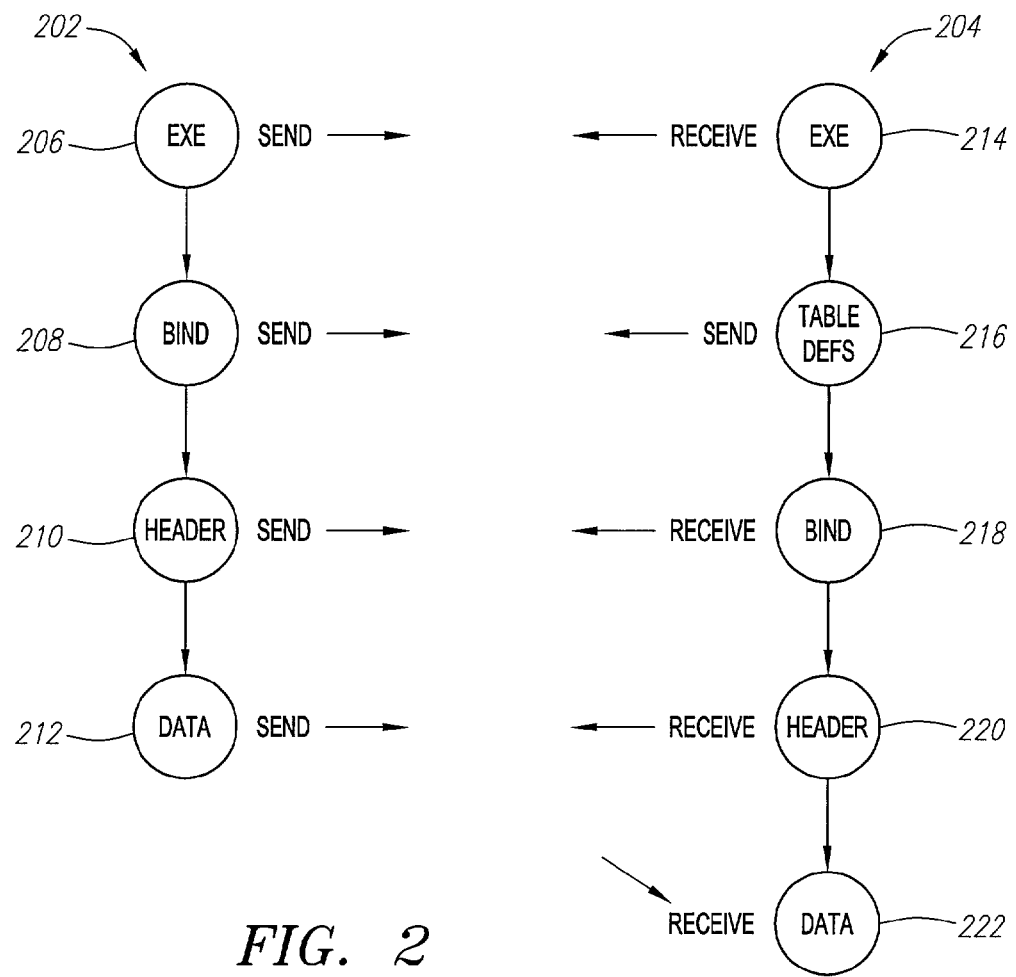
FIG. 2 depicts state chart diagrams showing the logical state of example state machines.

This conflict is illustrated in the state diagram charts of FIG. 2. Chart 202 represents the finite state machine at the first node and chart 204 represents the finite state machine at the second node. Each state element in chart 202 tracks the computations that occur at the first node as it issues the remote-mapped query to the second node. At the first node, state 206 represents the "send" of the remote-mapped query, state 208 represents a send of the bind variable information, state 210 represents sending the header information for data used in processing the query, and state 212 represents sending data from the first node to the second node. At the second node, each state for chart 204 should match an equivalent state in chart 202 at the first node. Thus, state 214 represents a "receive" of the query and processing for that query (corresponding to state 206 in chart 202), state 218 represents a receive of the bind variable information (corresponding to state 208), state 220 represents receiving the header information (corresponding to state 210), and state 212 represents receiving data from the first node (corresponding to state 212).

However, note that an additional state 216 exists in chart 204 at the second node that does not correspond to any existing state in chart 202 at the first node. State 216 represents the second node sending an information request for definitional information about one or more remote tables at the first node that are referenced in the remote-mapped query. It is this state 216 which may present a half-duplex conflict/error between the state machine at the first node represented by chart 202 and the statement at the second node represented by chart 204.

A possible approach to resolving this problem is to delay the "send" of the information request until after the bind variable information has already been received by the second node. In this approach, the bind variable information is first received from the communications pipeline and placed into temporary memory, and only afterwards is the information request transmitted. The drawback with this approach is that in some database systems, buffer space for a bind variable is normally not allocated until after the query has been parsed and appropriate information is identified for the bind variable. This type of buffer space for the bind variable is often specially allocated and located to allow its access to execute the query, and its allocation may not occur until after the second node receives the kind of information that it is requesting from the first node. Thus, an inefficiency occurs since after the second node finally receives the requested information from the first node, the second node would undergo a process to create the special buffer space, and then separately copy (e.g., using memcopy) the bind variable information from the temporary memory into the specially allocated buffer space.

According to one embodiment of the invention, a "toggle" state can be employed to address these types of half-duplex problems. The toggle state is a controllable and insertable mechanism that allows a state machine to switch from a first state to a second state. For example, if a state machine is in a "receive" state, then toggling can be performed to switch the state machine to a "send" state. Predictive toggling can therefore be performed to anticipate and resolve potential half-duplex violations between multiple state machines.

Figure 3:
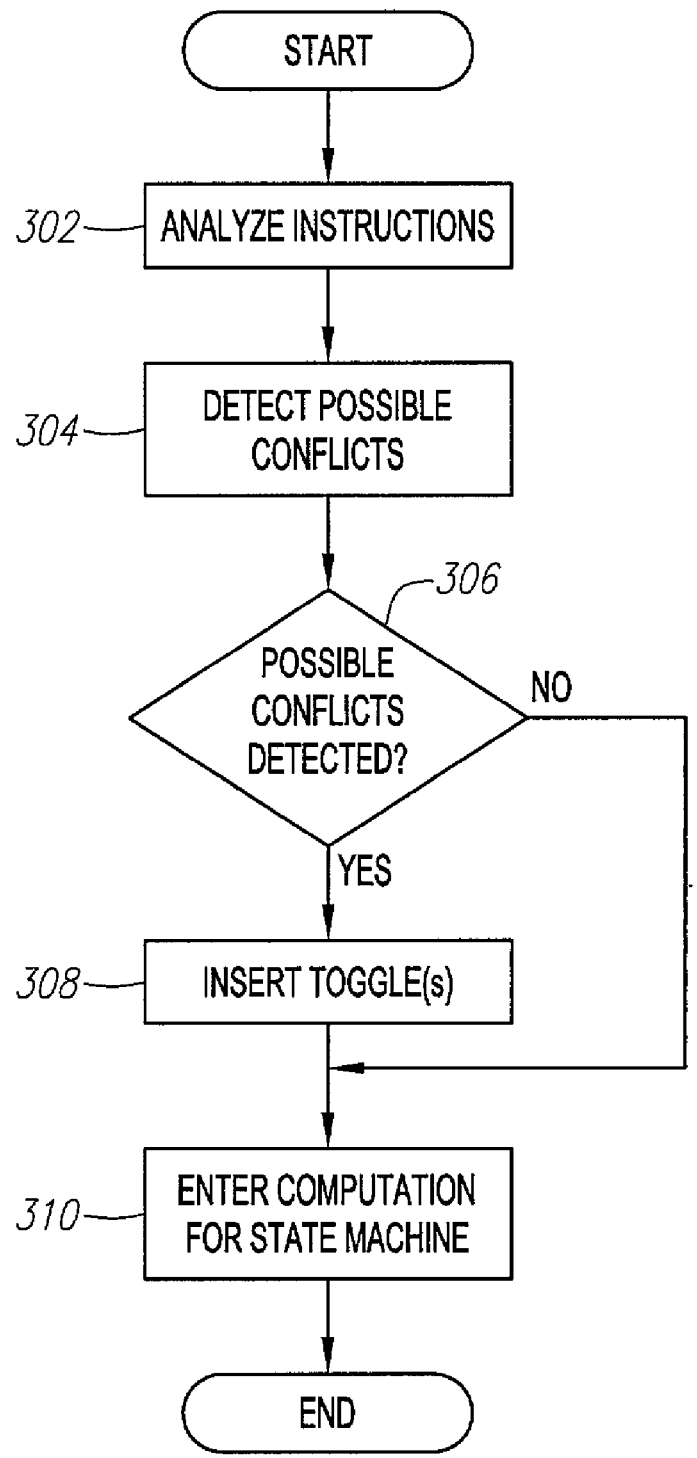
FIG. 3 is a flowchart of a process for dynamically configuring a state machine according to an embodiment of the invention.

FIG. 3 shows a flowchart of a process for resolving half-duplex violations according to one embodiment of the invention. At step 302, the instructions/commands communicated between two state machines are analyzed, and any possible state machine conflicts, e.g., half-duplex violations, are detected at step 304. For example, this type of conflict may arise in certain types of distributed computer systems involving remote-mapped queries having bind variables, in which a second computing system needs access to definitional data from a first computing system. As noted above, the request from the second computing system may overwrite the bind data that is sent from the first computing system, causing a half-duplex violation. In one embodiment of the invention, configuration settings are made to parse the query to identify such circumstances as a possible conflict scenario.

If such possible conflicts are detected (306), the corresponding state machines are dynamically configured to introduce one or more toggle states at the possible conflict points. In one embodiment, introduced toggle states at the first state machine should match introduced toggle states at the second state machine. The computations for each state machine are thereafter executed (step 310).

To illustrate, reference is made back to the state diagram charts of FIG. 2. Recall that in FIG. 2, chart 202 represents the finite state machine at the first node and chart 204 represents the finite state machine at the second node, in which the first node is sending a remote mapped query having a bind variable to the second node. At the first node, state 206 represents the "send" of the remote-mapped and query state 208 represents a send of the bind variable information. At the second node, state 214 represents a "receive" of the query and processing for that query, state 218 represents a receive of the bind variable information, and state 216 represents the second node sending an information request for definitional information about one or more remote tables at the first node that are referenced in the remote-mapped query. Since the state 216 in chart 204 at the second node does not correspond to any existing state in chart 202 at the first node, a conflict exists between the transition from state 206 to state 208 at the state machine at the first node and states 214, 216, and 218 at the state machine at the second node.

To resolve this problem, toggle states are introduced at the possible conflict points in the two state machines (step 308). This introduction of new toggle states can be made in a predictive manner based upon identifying the anticipated conflict. The new toggle states are introduced to match the conditions at the state machines at the two nodes.

Figure 4:
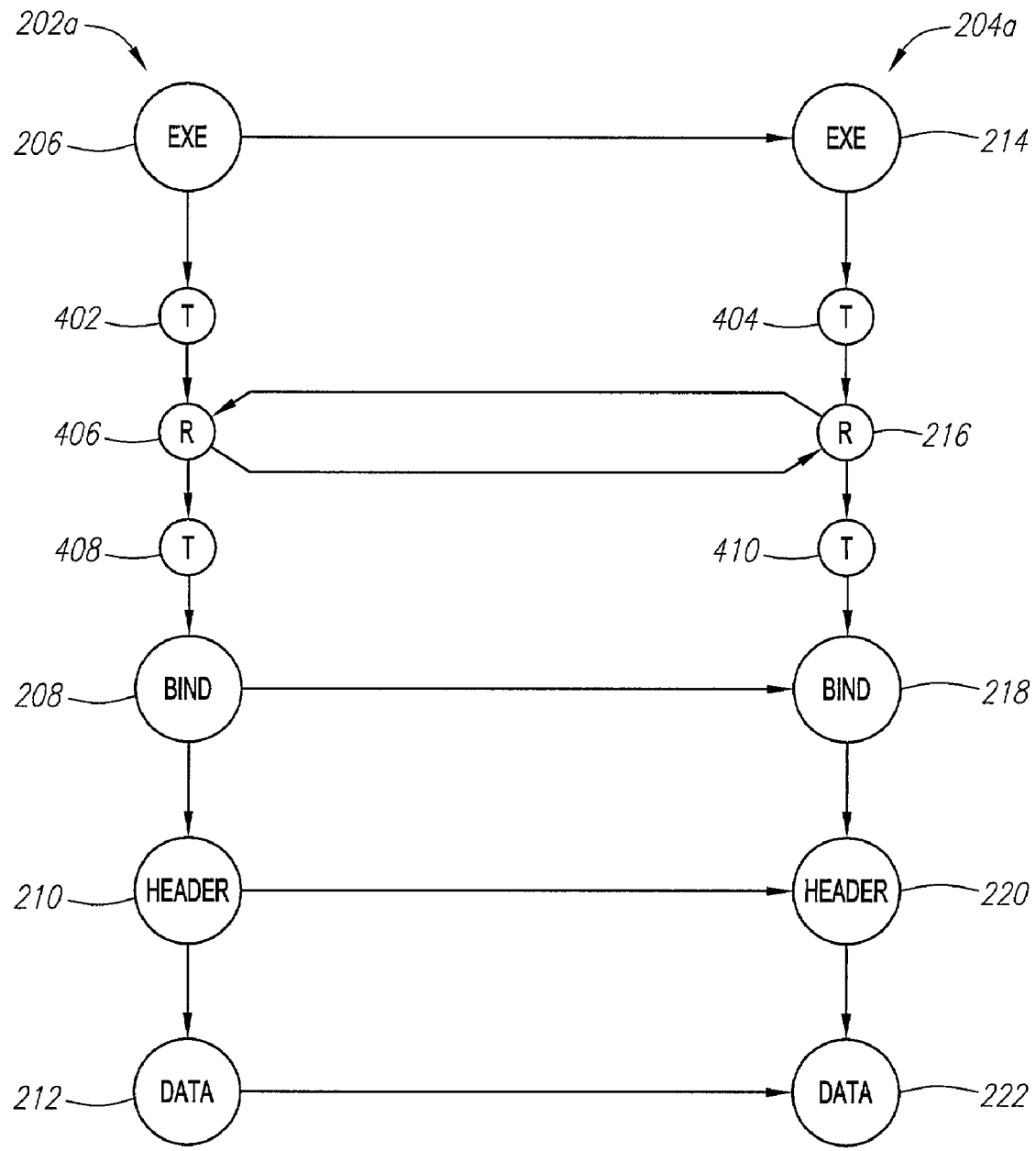
FIG. 4 depicts state chart diagrams showing the logical state of example state machines according to an embodiment of the invention.

FIG. 4 shows a modified state chart 202a for the first state machine and a modified state chart 204a for the second state machine. In particular, new toggle state 402, receive/send state 406, and toggle state 408 are introduced into the state machine at the first node. New toggle states 404 and 410 are introduced at the state machine at the second node. With these new toggle states, it can be seen that conditions are now exactly matched between the two state machines. The new toggle states at the first state machine allows the first state machine to wait for the other state machine before sending the bind variable. In particular, toggle state 402 switches the first state machine/first node from a "send" state to a "receive" state. This corresponds to toggle state 404 that switches the second state machine/second node from a "receive" state to "send" state. State 216 thereafter corresponds to the sending of an information request from the second node to the first node, which matches state 406 at the first state machine/first node. Toggle state 408 switches the first state machine/first node from a "receive" state to a "send" state. This corresponds to toggle state 410 that switches the second state machine/second node from a "send" state to "receive" state. Thereafter, information and bind variable information is sent normally from the first node to the second node.

It is noted that the invention is not limited to correcting only these types of conflicts, but may be employed to dynamically configure the logical paths of local state machines based upon any types of anticipated conditions and conflicts.

System Architecture Overview

Figure 5:
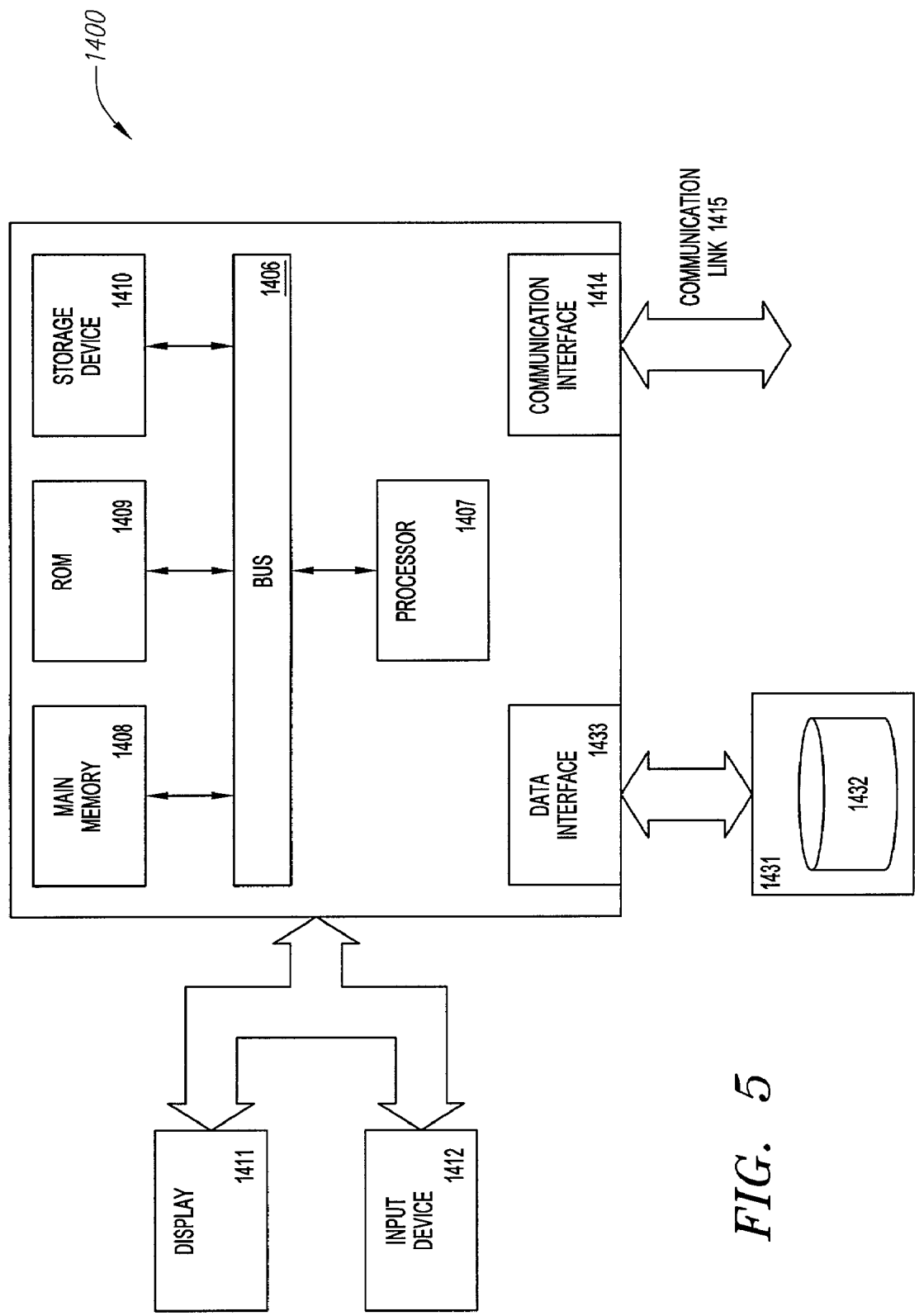
FIG. 5 is a diagram of a computer system architecture with which the present invention can be implemented.

The execution of the sequences of instructions required to practice the invention may be performed in embodiments of the invention by a computer system 1400 as shown in FIG. 5. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 5, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A method for executing a query in a database system, in which at least a portion of the query is sent for execution from a first node to a second node, the method comprising:
    a) sending at least a portion of the query from a first database node to a second database node;
    b) before completing an execution of the query, determining if processing the at least a portion of the query will cause a half-duplex error in communications between the first database node and the second database node;
    c) identifying states at the first and second database nodes that potentially cause the half-duplex error; and
    d) modifying the states identified in step (c) to address the half-duplex error.

2. The method of claim 1 in which the query comprises a remote-mapped query.

3. The method of claim 1 in which the query comprises a placeholder value, wherein the half-duplex error results from transmission of the placeholder value.

4. The method of claim 3 in which the placeholder value comprises a bind variable.

5. The method of claim 3 in which the half-duplex error is caused by conflict between transmission of the placeholder value and a request for information sent from the second database node to the first database node.

6. The method of claim 1 in which step (b) and (c) comprise analysis of expected response states at the first and second database nodes.

7. The method of claim 1 in which step (d) comprises introducing a toggle state.

8. The method of claim 7 in which the toggle state switches between a SEND and a RECEIVE state.

9. A computer program product comprising a computer usable medium having executable code to execute a method for executing a query in a database system, in which at least a portion of the query is sent for execution from a first node to a second node, the method comprising the steps of:
    a) sending at least a portion of the query from a first database node to a second database node;
    b) before completing an execution of the query, determining if processing the at least a portion of the query will cause a half-duplex error in communications between the first database node and the second database node;
    c) identifying states at the first and second database nodes that potentially cause the half-duplex error; and
    d) modifying the states identified in step (c) to address the half-duplex error.

10. The computer program product of claim 9 in which the query comprises a remote-mapped query.

11. The computer program product of claim 9 in which the query comprises a placeholder value, wherein the half-duplex error results from transmission of the placeholder value.

12. The computer program product of claim 11 in which the placeholder value comprises a bind variable.

13. The computer program product of claim 11 in which the half-duplex error is caused by conflict between transmission of the placeholder value and a request for information sent from the second database node to the first database node.

14. The computer program product of claim 9 in which step (b) and (c) comprise analysis of expected response states at the first and second database nodes.

15. The computer program product of claim 9 in which step (d) comprises introducing a toggle state.

16. The computer program product of claim 15 in which the toggle state switches between a SEND and a RECEIVE state.

17. A system for executing a query in a database system, in which at least a portion of the query is sent for execution from a first node to a second node, the system comprising:
    a) means for sending at least a portion of the query from a first database node to a second database node;
    b) means for, before completing an execution of the query, determining if processing the at least a portion of the query will cause a half-duplex error in communications between the first database node and the second database node;
    c) means for identifying states at the first and second database nodes that potentially cause the half-duplex error; and
    d) means for modifying the states identified in step (c) to address the half-duplex error.

18. The system of claim 17 in which the query comprises a remote-mapped query.

19. The system of claim 17 in which the query comprises a placeholder value, wherein the half-duplex error results from transmission of the placeholder value.

20. The system of claim 19 in which the placeholder value comprises a bind variable.

21. The system of claim 19 in which the half-duplex error is caused by conflict between transmission of the placeholder value and a request for information sent from the second database node to the first database node.

22. The system of claim 17 in which the means of (b) and/or (c) comprise means for analyzing expected response states at the first and second database nodes.

23. The system of claim 17 in which the means of (d) comprises means for introducing a toggle state.

24. The system of claim 23 in which the toggle state switches between a SEND and a RECEIVE state.

25. A method for dynamically configuring state machines in a computing architecture in which a first finite state machine interacts with a second finite state machine, the method comprising:
   a) analyzing states during the interaction between the first finite state machine and the second finite state machine;
   b) determining if an error will occur as a result of a conflict between the first finite state machine and the second finite state machine;
   c) identifying specific states that results in the error; and
   d) in response to a result from the act of identifying, modifying either or both the first and second finite state machines to address the error that is associated with the conflict between the first and the second finite state machines;
   wherein the first and second state machines comprise database entities.

26. The method of claim 25 in which the error comprises a half-duplex communication error.

27. The method of claim 25 in which the error is associated with a conflict between SEND and RECEIVE states at the first and second finite state machines.

28. The method of claim 25 in which steps (a), (b) and/or (c) comprise analysis of expected response states at the first and second finite state machines.

29. The method of claim 25 in which step (d) comprises introducing a toggle state.

30. The method of claim 29 in which the toggle state switches between a SEND and a RECEIVE state.

31. A system for dynamically configuring state machines in a computing architecture in which a first finite state machine interacts with a second finite state machine, comprising:
   a) means for analyzing states during the interaction between the first finite state machine and the second finite state machine;
   b) means for determining if an error will occur as a result of a conflict between the first finite state machine and the second finite state machine;
   c) means for identifying specific states that results in the error; and
   d) means for, in response to a result from the act of identifying, modifying either or both the first and second finite state machines to address the error that is associated with the conflict between the first and the second finite state machines;
   wherein the first and second state machines comprise database entities.

32. The system of claim 31 in which the error comprises a half-duplex communication error.

33. The system of claim 31 in which the error is associated with a conflict between SEND and RECEIVE states at the first and second finite state machines.

34. The system of claim 31 in which the means for modifying either or both the first and second finite state machines to address the error comprises means for introducing a toggle state.

35. The system of claim 34 in which the toggle state switches between a SEND and a RECEIVE state.

36. A computer program product comprising a computer usable medium having executable code to execute a method for dynamically configuring state machines in a computing architecture in which a first finite state machine interacts with a second finite state machine, the method comprising:
   a) analyzing states during the interaction between the first finite state machine and the second finite state machine;
   b) determining if an error will occur as a result of a conflict between the first finite state machine and the second finite state machine;
   c) identifying specific states that results in the error; and
   d) in response to a result from the act of identifying, modifying either or both the first and second finite state machines to address the error that is associated with the conflict between the first and the second finite state machines;
   wherein the first and second state machines comprise database entities.

37. The computer program product of claim 36 in which the error comprises a half-duplex communication error.

38. The computer program product of claim 36 in which the error is associated with a conflict between SEND and RECEIVE states at the first and second finite state machines.

39. The computer program product of claim 36 in which steps (a), (b) and/or (c) comprise analysis of expected response states at the first and second finite state machines.

40. The computer program product of claim 36 in which step (d) comprises introducing a toggle state.

41. The computer program product of claim 40 in which the toggle state switches between a SEND and a RECEIVE state.

* * * * *